(12) United States Patent
Maurer

(10) Patent No.: US 11,154,938 B2
(45) Date of Patent: Oct. 26, 2021

(54) CHUCK

(71) Applicant: SMW-Autoblok Spannsysteme GmbH, Meckenbeuren (DE)

(72) Inventor: Eckhard Maurer, Oberteuringen (DE)

(73) Assignee: SMW-Autoblok Spannsysteme GmbH

(*) Notice: Subject to any disclaimer, the term of this patent is extended or adjusted under 35 U.S.C. 154(b) by 0 days.

(21) Appl. No.: 16/568,727

(22) Filed: Sep. 12, 2019

(65) Prior Publication Data
US 2020/0086397 A1  Mar. 19, 2020

(30) Foreign Application Priority Data
Sep. 13, 2018 (EP) ..................... 18194142

(51) Int. Cl.
*B23B 31/14* (2006.01)
*B23B 31/177* (2006.01)
*B23B 31/16* (2006.01)

(52) U.S. Cl.
CPC ........ *B23B 31/16233* (2013.01); *B23B 31/14* (2013.01); *B23B 31/16045* (2013.01); *B23B 2231/22* (2013.01); *B23B 2231/30* (2013.01)

(58) Field of Classification Search
CPC ............ B23B 2231/22; B23B 2270/04; B23B 31/16045; B23B 31/16062;
(Continued)

(56) References Cited

U.S. PATENT DOCUMENTS 1,786,147 A   12/1930 Bullard
2,612,378 A *  9/1952 Highberg .......... B23B 31/16262
                                                   279/121

(Continued)

FOREIGN PATENT DOCUMENTS

DE        10100148       7/2002
DE     102015104058      6/2016
(Continued)

*Primary Examiner* — Eric A. Gates
*Assistant Examiner* — Chwen-Wei Su
(74) *Attorney, Agent, or Firm* — Pandiscio & Pandiscio

(57) ABSTRACT

In a chuck (1) by means of which workpieces (2) are supported individually and centered for machining by a machine tool, the chuck comprising:
  a chuck body (3),
  four clamping jaws (5, 6, 7, 8) which are radially movably mounted on the chuck body (3) and are each arranged in pairs in an X or Y plane, and
  a drive piston (9) which is mounted in the chuck body (3) so as to be axially movable and which is drivably coupled to the four clamping jaws (5, 6, 7, 8) via a helical surface or helical gearing (10) worked on the drive piston (9) and the respective clamping jaws (5, 6, 7, 8), and feeds these synchronously in the direction of the workpiece (2) to be clamped or moves them away from the latter,
a position-accurate, i.e. centered alignment for a large number of differently designed workpieces (2) can be achieved with a high repetition accuracy for subsequent clamping operations.
This is achieved in that
  a rocker (11) is provided between the drive piston (9) and two adjacent clamping jaws (5, 7 or 6, 8),
  the rocker (11) has a center of symmetry (12) into which a bolt (13) which is pivotably mounted on the drive piston (9) and about which the rocker (11) can be pivoted as a function of the contact of the clamping jaws (5, 6 or 7, 8) on the workpiece (2) is inserted, and
  a corresponding transmission pin (14, 15) is provided laterally adjacent to the bolt (13) and coupled drivably to the rocker (11), the respective clamping jaw (5, 6, 7, 10 or 8) being mounted and supported at the end of the transmission pin opposite the rocker (11).

9 Claims, 8 Drawing Sheets

(58) Field of Classification Search
CPC ......... B23B 31/16083; B23B 31/16116; B23B 31/16066; B23B 31/14; B23B 2231/30; B23B 31/16233; B23B 31/16254; Y10T 279/25; Y10T 279/1946; Y10T 279/1953; Y10T 279/19; Y10T 279/1961; Y10T 279/1973

See application file for complete search history.

(56) References Cited

U.S. PATENT DOCUMENTS

| | | | | |
|---|---|---|---|---|
| 2,775,461 | A | * | 12/1956 | Ehrlich ............. B23B 31/16195 |
| | | | | 279/119 |
| 2,828,134 | A | * | 3/1958 | Buck ................. B23B 31/16233 |
| | | | | 279/119 |
| 4,047,723 | A | * | 9/1977 | Buck ....................... B23B 31/14 |
| | | | | 279/121 |
| 4,097,053 | A | * | 6/1978 | Steinberger ............. B23B 31/14 |
| | | | | 279/121 |
| 4,938,491 | A | * | 7/1990 | Sumenko .......... B23B 31/16045 |
| | | | | 279/121 |
| 2018/0029139 | A1 | | 2/2018 | Henke |

FOREIGN PATENT DOCUMENTS

DE   10 2015 204502   9/2016
KR         101599513   3/2016

* cited by examiner

CHUCK

REFERENCE TO PENDING PRIOR PATENT APPLICATION

This patent application claims benefit of European Patent Application No. 18 194 142.8, filed Sep. 13, 2018, which patent application is hereby incorporated herein by reference.

FIELD OF THE INVENTION

The invention refers to a chuck by means of which workpieces are supported individually and centered for machining by a machine tool.

BACKGROUND OF THE INVENTION

For example, such a clamping device, which is known under the technical term chuck, can be found in DE 10 2015 204 502 B4. Between the base jaws and a mechanically actuated drive unit, a rocker and a driver are provided, each of which is connected to one of the rocker motors. In addition, a coupling ring is arranged in the center of the chuck, to which the four drivers are attached, in such a way that there is clearance between these components in the radial direction. The coupling ring can be rotated around the clamping axis in the chuck body or housing of the chuck. Turning the coupling ring creates a radial feed movement of the base jaw so that a workpiece is held by the four clamping jaws, as these move in the direction of the workpiece and generate a clamping force.

Since the clamping of a workpiece by means of four clamping jaws diametrically opposite in pairs represents a mechanical overdetermination, the clearance between the coupling ring and the respective driver must be provided. If one of the pairs of clamping jaws strikes the workpiece to be clamped earlier, its feed movement must be stopped in order to ensure that the clamping jaws running perpendicular to it can cover the remaining distance between them and the surface of the workpiece. Only when all four clamping jaws are in contact with the surface of the workpiece should a corresponding clamping force be generated. The movement play thus serves as compensation for the clamping jaws when they are moved in the direction of the workpiece. Especially if the workpieces have a rectangular outer contour so that their side lengths are dimensioned differently, it is necessary to compensate for these different distances between the pairs of diametrically opposed clamping jaws.

Due to the required clearance between the coupling ring and the driver, which are mechanically coupled to the base jaws or clamping jaws, a considerable inaccuracy often occurs, so that the positioning of the workpiece is incorrect. This in turn leads to machining errors on the workpiece itself, as the repeat accuracy of the clamping of a large number of identical workpieces cannot be guaranteed.

Disadvantageously, however, such movement possibilities are often associated with considerable tolerance deviations with regard to the clamping effect, so that the required clamping force is not exactly predictable or more predetermined.

The existing motion plays between the components arranged in the powerflow lead to a relative motion between these components.

SUMMARY OF THE INVENTION

It is therefore the task of the present invention to further develop a chuck of the aforementioned type in such a way that a precisely positioned, i.e. centered, alignment for a large number of differently designed workpieces can be achieved with a high repeat accuracy for subsequent clamping operations.

This task is solved in accordance with the present invention by the features of the pre-characterising clause of claim 1.

Further advantageous embodiments of the invention results from the subordinate claims.

In that a rocker is provided between the drive piston and in each case two adjacent clamping jaws, in that the rocker has a center of symmetry into which a bolt mounted on the drive piston is inserted, about which bolt the rocker is pivotably supported as a function of the contact of the clamping jaws with the workpiece, and in that a transmission pin is in each case provided laterally adjacent to the bolt, at the opposite end of which the respective clamping jaw is mounted and supported on the rocker, the result is achieved that the distance of two adjacent clamping jaws in relation to the distance to the workpiece is compensated, without, however, any play of movement or other uncontrollable deviations arising within the powerflow, in which case precise alignment of the workpiece to be clamped can be ensured in each situation.

Since the rocker is installed between the drive piston and the respective clamping jaw to be moved, i.e. within the powerflow, and the rocker transmits the relative movements of the drive piston directly through the transmission pins to the clamping jaws, a backlash-free and compensating clamping of the workpiece is achieved. The clamping jaws diametrically opposed in pairs are assigned to an identical length of a workpiece, so that in the case of rectangular workpieces, one pair of clamping jaws is the first to make contact with the workpiece. The further feed movement of these clamping jaws must be interrupted until the vertically arranged pair of clamping jaws reaches the workpiece. The drive piston performs an axial movement so that the rockers and the transmission pins are also moved parallel to the longitudinal axis of the chuck body. Due to the existing helical gearing, the drive piston and the clamping jaws, the axial feed movement of the drive piston is converted into a radial feed movement for the clamping jaws.

It is particularly advantageous if a centrifugal weight is arranged in the chuck body, which is mechanically coupled to one of the clamping jaws via a lever. The lever is mounted in the chuck body and the alignment of the lever creates a centripetal force during the rotation of the chuck body which acts on the centrifugal weight and pushes it outward. Consequently, the lever is moved in the direction of the longitudinal axis of the chuck body and a radial additional clamping force is generated on the respective clamping jaws. The shape of the rockers and transmission pins does not prevent this additional increase in clamping force, because the powerflow applied by the drive piston acts directly on the clamping jaws and the centrifugal weights generate an independent clamping force component due to the rotation of the chuck body.

In order to achieve the movements of the rocker on the respective transmission pin without canting or jamming, a guide groove is worked into the rocker, into which one of the transmission pins is movably inserted. A head integrally formed on the respective transmission pin has no play relative to the longitudinal axes of the width of the guide groove, so that two flanks of the head rest against the inner wall of the guide groove, as a result of which play-free force transmission is achieved between the rocker and the head of the transmission pin in the direction of movement. When the rocker is deflected to one side, the head moves linearly in the guide groove because the length of the head is smaller than the length of the guide groove; however, at the same time, force can be transmitted in the direction of movement because the rocker is deflected within an extremely small angular range.

The rocker is suspended on the drive piston in its center of symmetry and the distance between the guide grooves and this center of symmetry is the same, so that the deflection of the rocker is identical on all four rockers and is assigned to the clamping jaw which makes contact with the workpiece to be clamped first.

BRIEF DESCRIPTION OF THE DRAWINGS

The drawings show a chuck in accordance with the invention, which is explained in more detail below. In the drawings.

DETAILED DESCRIPTION OF THE PREFERRED EMBODIMENTS

Figure 1:
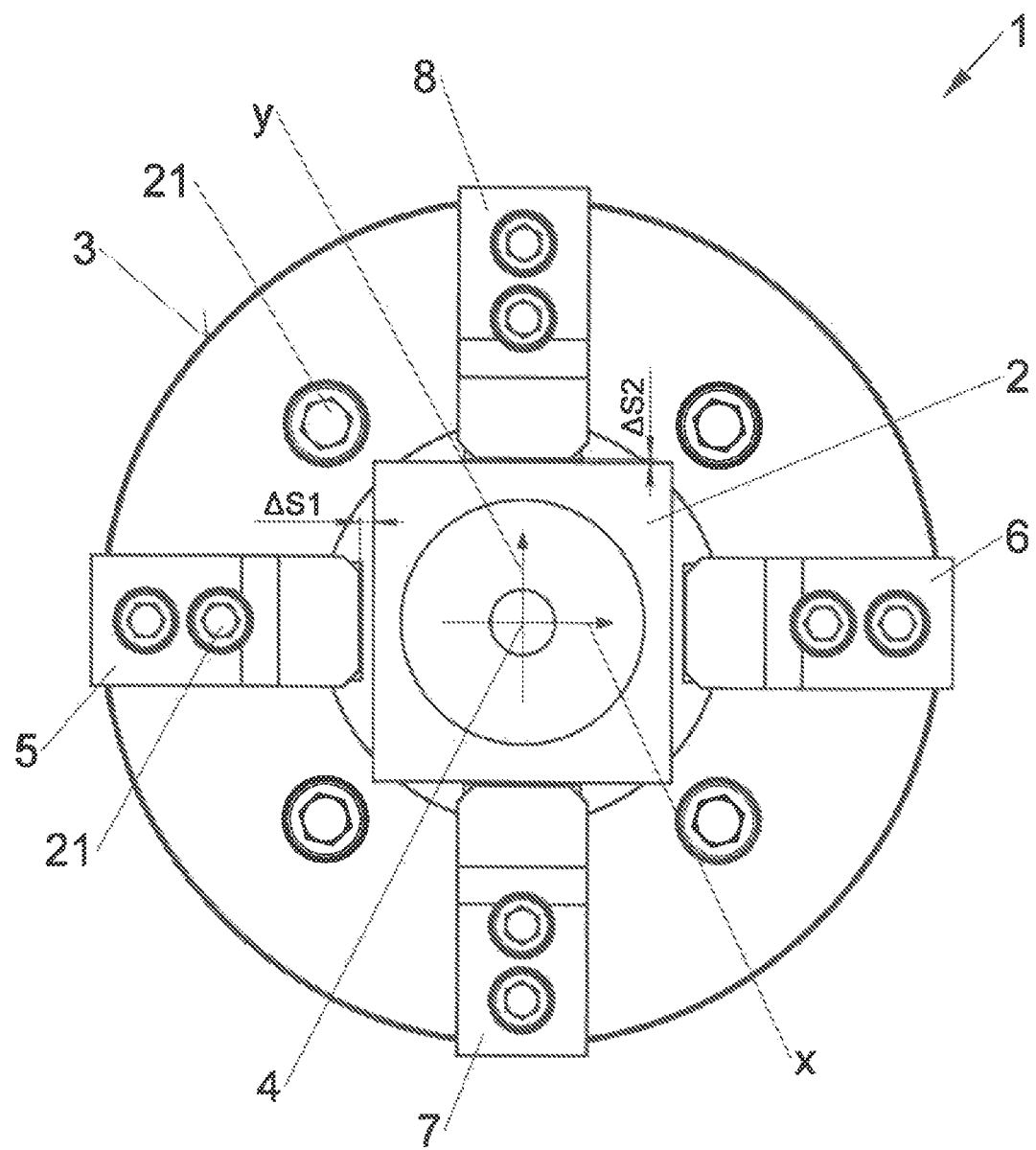
FIG. 1 shows a chuck with a chuck body in which four clamping jaws aligned perpendicularly to one another are mounted so as to be radially displaceable, by means of which an at least partially rectangular workpiece is held centered in space, in a plan view.

FIG. 1 shows a chuck 1 by means of which a partially rectangular workpiece 2 centered in space for machining is supported by an unrepresented machine tool. The chuck 1 consists of a chuck body 3, on which four clamping jaws 5, 6, 7 and 8 are mounted so that they can be moved.

The clamping jaws 5 and 6 are located in an X plane, i.e. diametrically opposite, and the clamping jaws 7 and 8 are located in a Y plane perpendicular to it. The four clamping jaws 5, 6, 7 and 8 are moved radially in the direction of the center of the chuck body 3, i.e. in the direction of its longitudinal axis 4 and in the direction of the workpiece 2. If, however, the workpiece 2 to be clamped has a trapezoidal or star-shaped outer contour, then the clamping jaws 5, 6, 7, 8 can be arranged in any position so that two of the four clamping jaws 5, 6, or 7, 8, although running through one of the x or y planes, these planes are not perpendicular to each other.

If the workpiece has 2 different edge lengths or other different outer contours—this is schematically represented by ΔS1 as well as ΔS2—then the pairs of clamping jaws 5, 6 or 7, 8 meet the surface of the workpiece 2 in a different time span. If the distance ΔS1 is larger than the distance ΔS2 between the clamping jaws 5, 6 or 7, 8, then a different time of impact occurs. However, the four clamping jaws 5, 6, 7 and 8 are moved synchronously by means of a drive piston 9, so that this spatial or temporal offset must be compensated.

In addition, it is problematic to position the workpiece 2 exactly aligned to the longitudinal axis 4 manually or mechanically. Often the center of symmetry of the workpiece 2 is not aligned with the longitudinal axis 4 of the chuck body 3. The infeed of the clamping jaws 5, 6, 7 and 8 should solve this problem both in the X and in the Y plane by compensating the existing distance differences by moving the workpiece 2. This is done by the diametrically opposed clamping jaws 5, 6 or 7, 8, diametrically opposed in pairs, moving the workpiece 2 in the X and/or Y plane in order to align the center of symmetry of the workpiece 2 with the longitudinal axis 4 of the chuck body 3. As soon as workpiece 2 is clamped between two opposite clamping jaws 5, 6 or 7, 8, it is positioned in the respective X or Y plane.

However, if the clamping jaws 5, 6, 7 and 8 are moved synchronously by the drive piston 9, then the time difference of the impact of the clamping jaws 5, 6, 7 and 8 on the workpiece 2 must be compensated. This time or geometry compensation can be seen in detail in FIGS. 2 to 5c.

Figure 2:
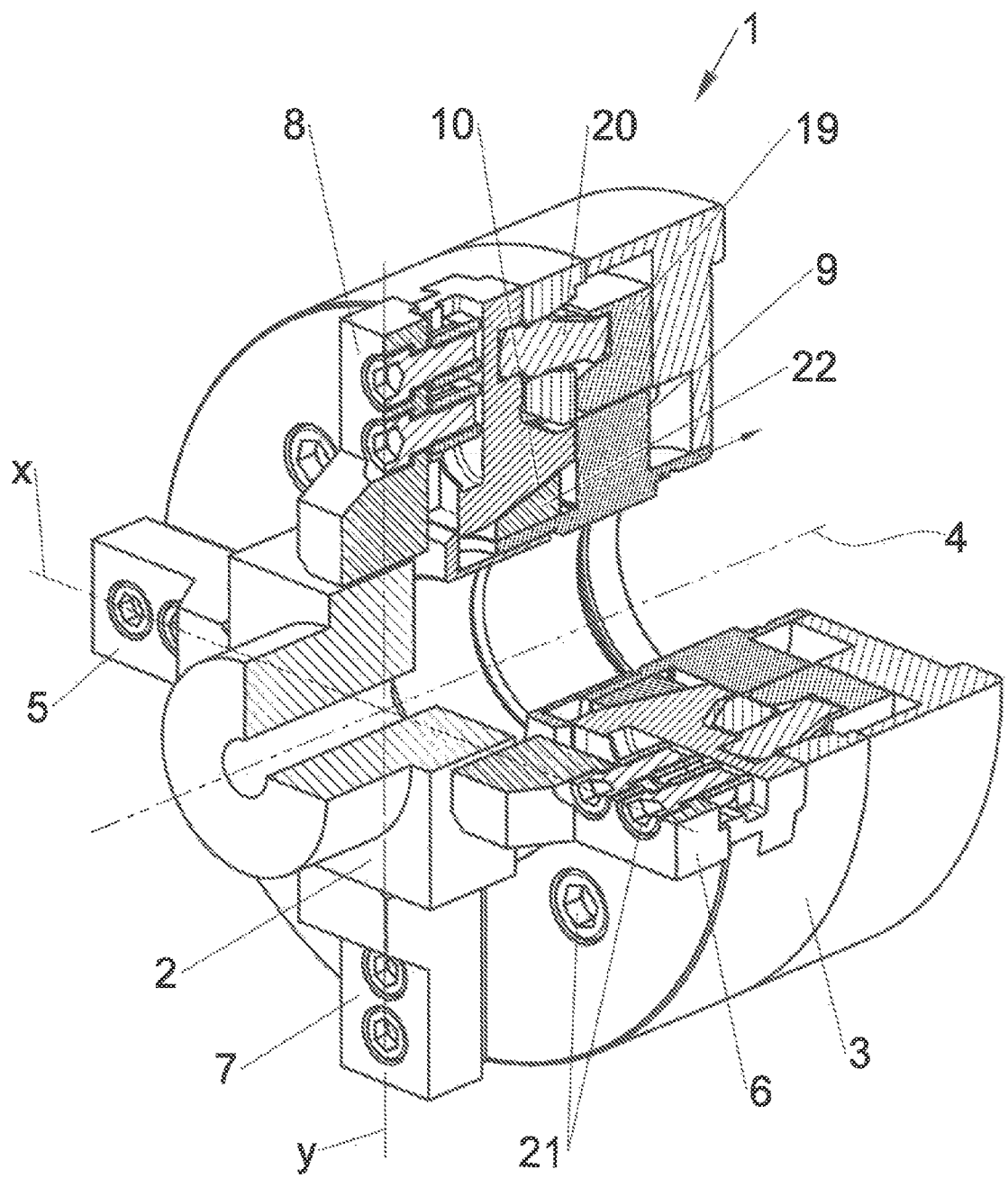
FIG. 2 shows the chuck in accordance with FIG. 1, in a perspective view and partially cut open and with four centrifugal weights assigned to the respective clamping jaw, which are mechanically coupled to these via a lever.

FIG. 2 shows that the drive piston 9 has a helical gearing 10 which interacts with a helical gearing 10 machined on the clamping jaws 5, 6, 7 and 8. If the drive piston 9 is moved away from the workpiece 2 to be clamped and the drive piston 9 is pressed between the clamping jaws 5, 6, 7 and 8 against their helical gearing 10 in each case, then this force transmission shifts the clamping jaws 5, 6, 7, 8 radially in the direction of the longitudinal axis 4, i.e. in the direction of the workpiece 2.

In addition, centrifugal weights 19 are mounted in the chuck body 3 so that they can be moved and each of them is coupled to one of the clamping jaws 5, 6, 7 or 8 by means of a lever 20. The lever 20 is swivel-mounted in the chuck body 3. The starting position of the chuck 1 shown in FIG. 2 shows that the centrifugal weights 19 are arranged closer to the longitudinal axis 4 and that the lever 20 thus runs diagonally outwards in relation to the direction of the workpiece 2 to be clamped. However, as soon as the chuck body 3 is set in rotation, the centrifugal weights 19 are pressed outwards due to the centripetal forces acting on them, so that the distance between the centrifugal weights 19 and the longitudinal axis 4 increases. Thus the free end of the lever 20 assigned to the centrifugal weight 19 is also moved away from the longitudinal axis 4 and the free end of the lever 20 assigned to the respective clamping jaws 5, 6, 7 or 8 is moved in the direction of the longitudinal axis 4, thus creating an additional clamping force to fix the workpiece 2.

Figure 3:
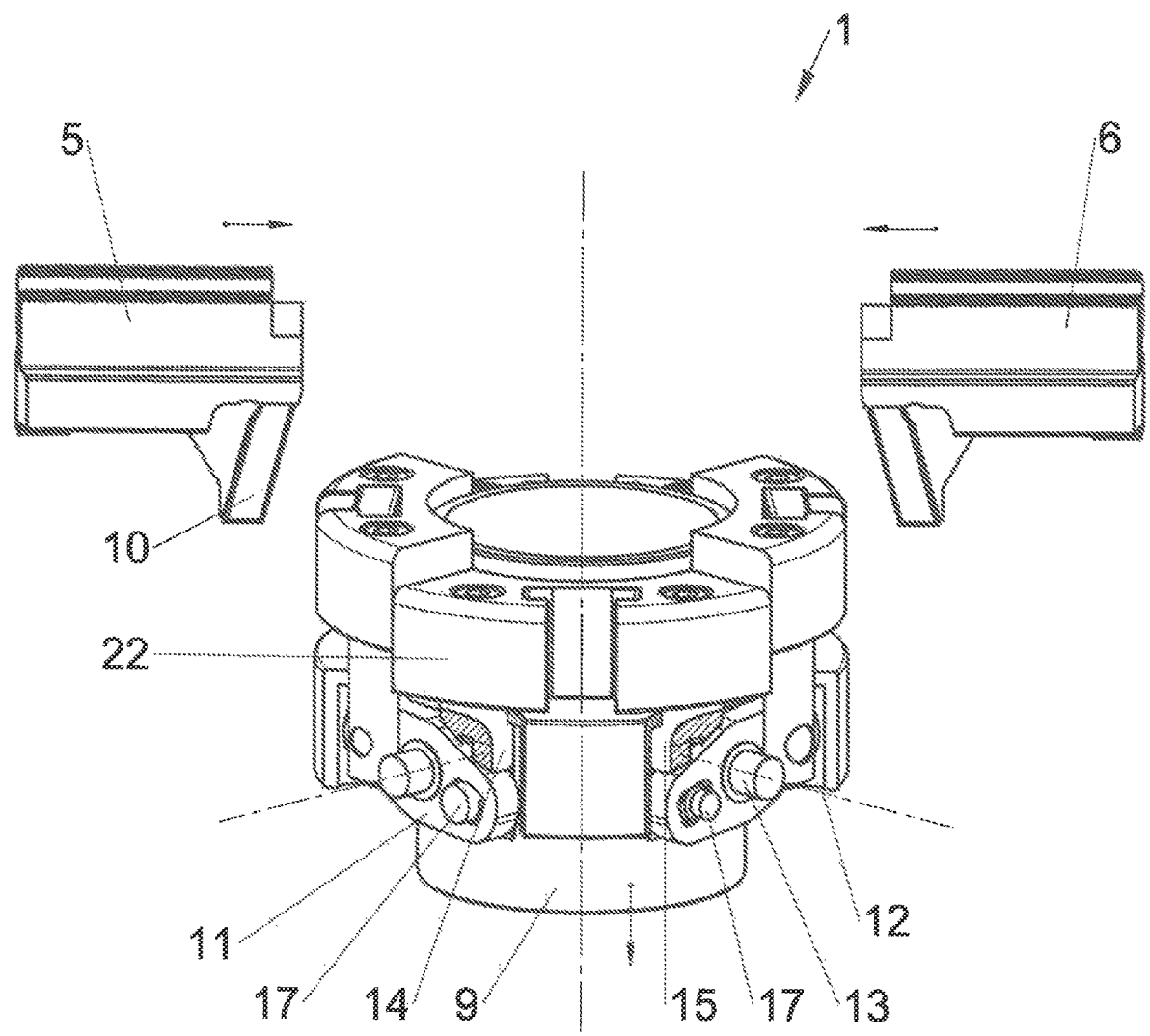
FIG. 3 shows a drive piston of the chuck in accordance with FIG. 1 with removed clamping jaws and the inclined surfaces arranged thereon for their radial infeed as well as with four rockers mounted on the outside of the drive piston, which are drivably coupled to one of the clamping jaws via a respective transmission pin.

FIG. 3 shows that four free spaces 23 are incorporated in the drive piston 9, in which the four rockers 11 are inserted or arranged, which have a center of symmetry 12. In the center of symmetry 12 there is a mounting hole in which a bolt 13 engages. The bolt 13 is supported by the drive piston 9. The rocker 11 can also be pivoted on the bolt 13.

Two guide grooves 16 are worked into the side of the rocker 11 next to the bolt 13, which are aligned perpendicular to the longitudinal axis 4 when the rocker 11 is not actuated. This means that the rocker 11 is not deflected in the non-actuated state, but rather runs perpendicular to the longitudinal axis 4.

Figure 4A:
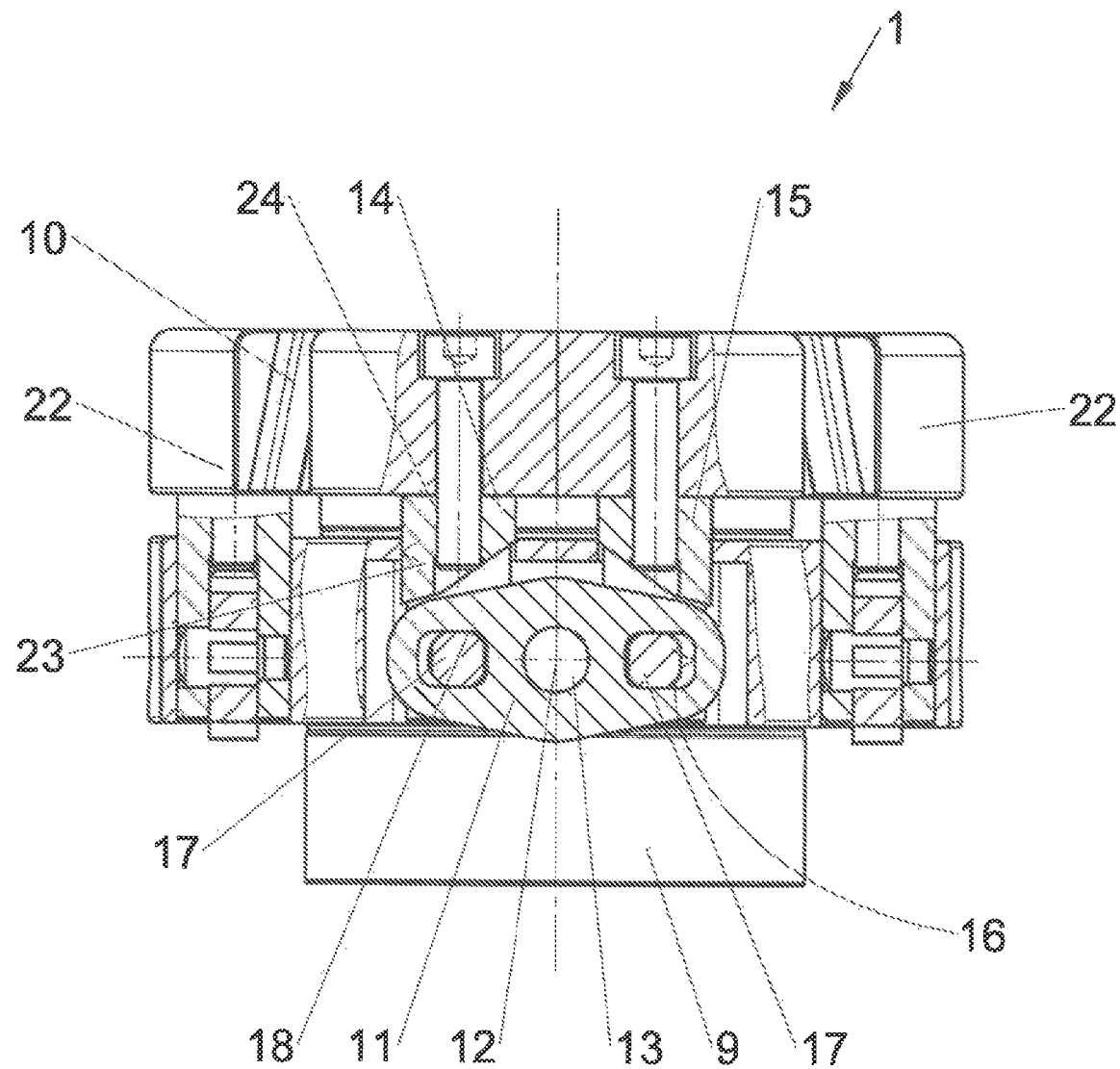
FIG. 4a shows the drive piston of the chuck in accordance with FIG. 3 in the initial condition and in a sectional view.
Figure 4B:
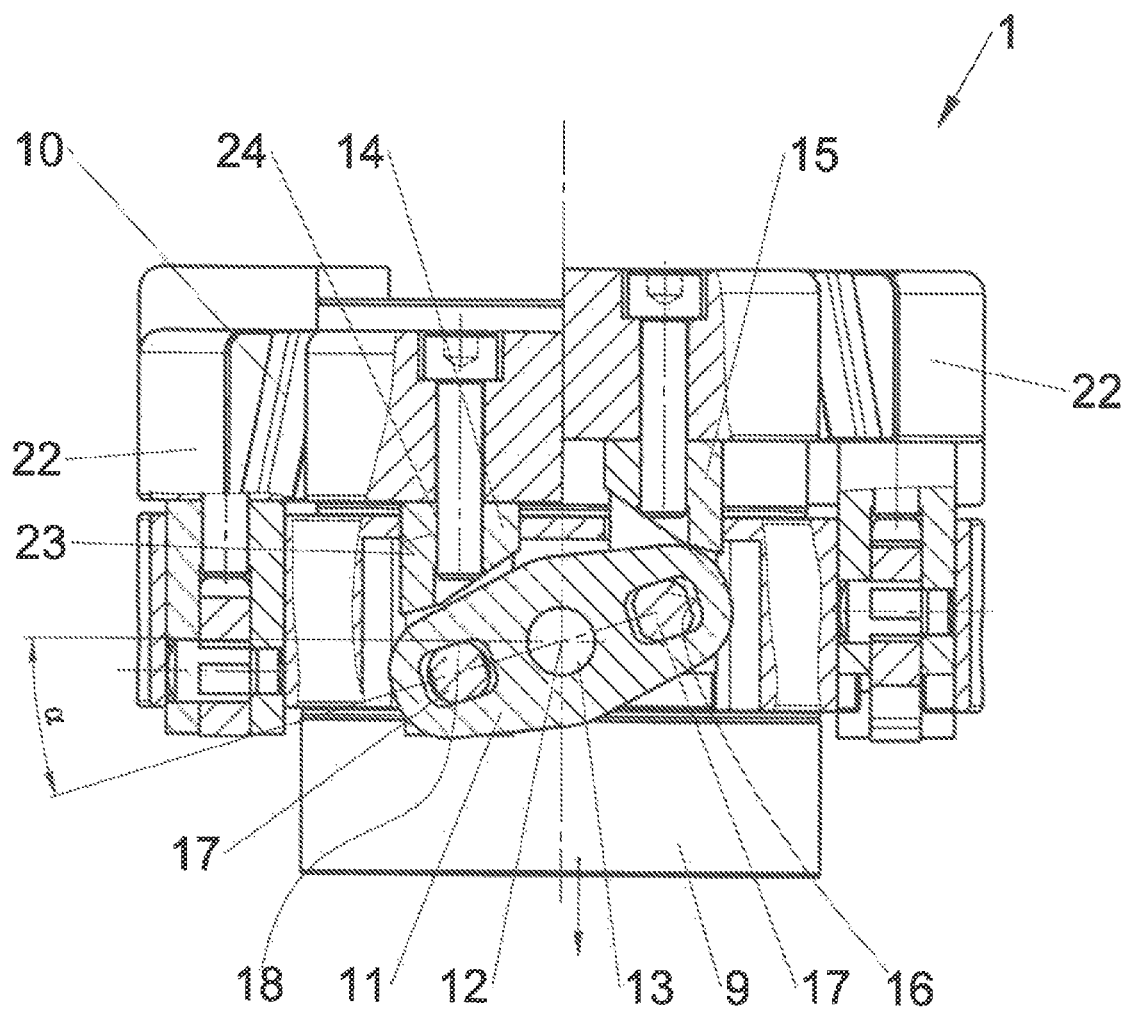
FIG. 4b shows the drive piston of the chuck as shown in FIG. 4a in a rocker deflection position.

FIGS. 4a and 4b show the operation of rocker 11 and the transmission of force between it and the respective clamping jaws 5, 6, 7 or 8. A first and a second transfer pin 14 and 15 respectively are inserted into the respective guide groove 16. The first transfer pin 14 is assigned to the clamping jaws 5 and 6 and the second transfer pin 15 is assigned to the clamping jaws 7 and 8 and drive coupled to them, In addition, a head 17 is provided at the free end of transmission pins 14 and 15 assigned to rocker 11, which can be inserted linearly into the respective guide groove 16. The outer contour of the head 17 is adapted to the inner contour of the guide groove 16 in such a way that the end faces running in the direction of the longitudinal axis 4 rest against the inner wall of the guide groove 16 and that there is a clearance or air gap between the end faces of the heads 17 running perpendicular to the longitudinal axis 4. Thus, the heads 17 can be moved perpendicular to the longitudinal axis 4 relative to the guide groove 16 when the rocker 11 is moved around the bolt 13 in one of the two possible deflections. In accordance with FIG. 4b, the clamping jaw 7 strikes the workpiece 2 first, so that the clamping jaw 5 has to be moved further in the direction of the workpiece 2. Accordingly, this feed difference between the two pairs of clamping jaws 7 and 8 on the one hand and 5 and 6 on the other is compensated by the rocker 11 by the deflection a shown. The drive piston 9 is pulled away from the workpiece 2 to be clamped so that the clamping jaws 7 and 8, which are already in contact with the workpiece 2, are held in their position and the difference between ΔS2 minus ΔS1 is compensated by the tilting of the rocker 11.

Furthermore, a transmission wedge 22 is arranged in each of the four free spaces 23 to bridge the distance between the rocker 11 and the respective clamping jaw 5, 6, 7 or 8. The respective transmission wedge 22 has through-holes 24 worked into it, through which the respective transmission pin 14, 15 reaches or protrudes.

Figure 5A:
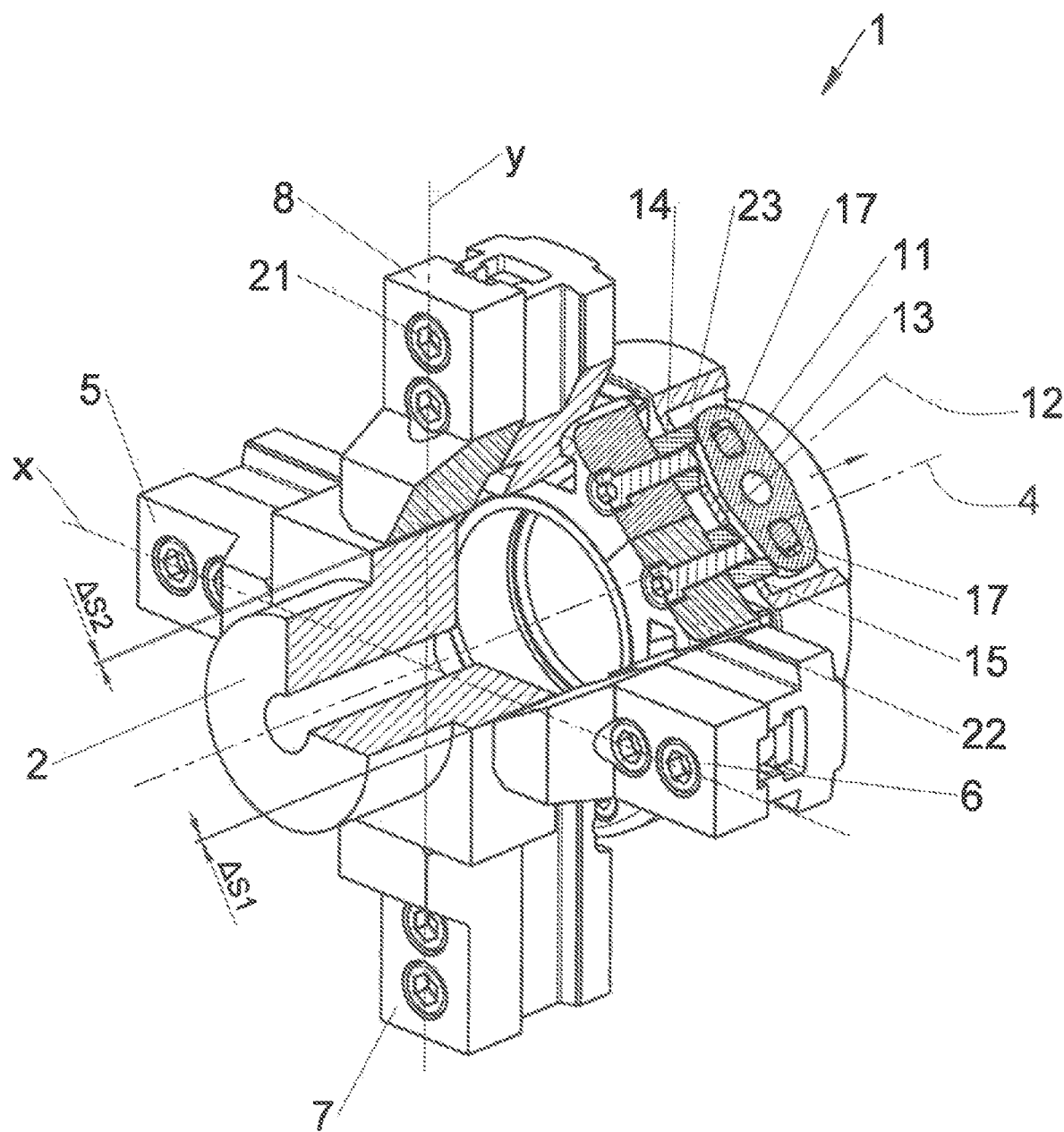
FIG. 5a shows the chuck in accordance with FIG. 1 in the initial condition and a partial section.
Figure 5B:
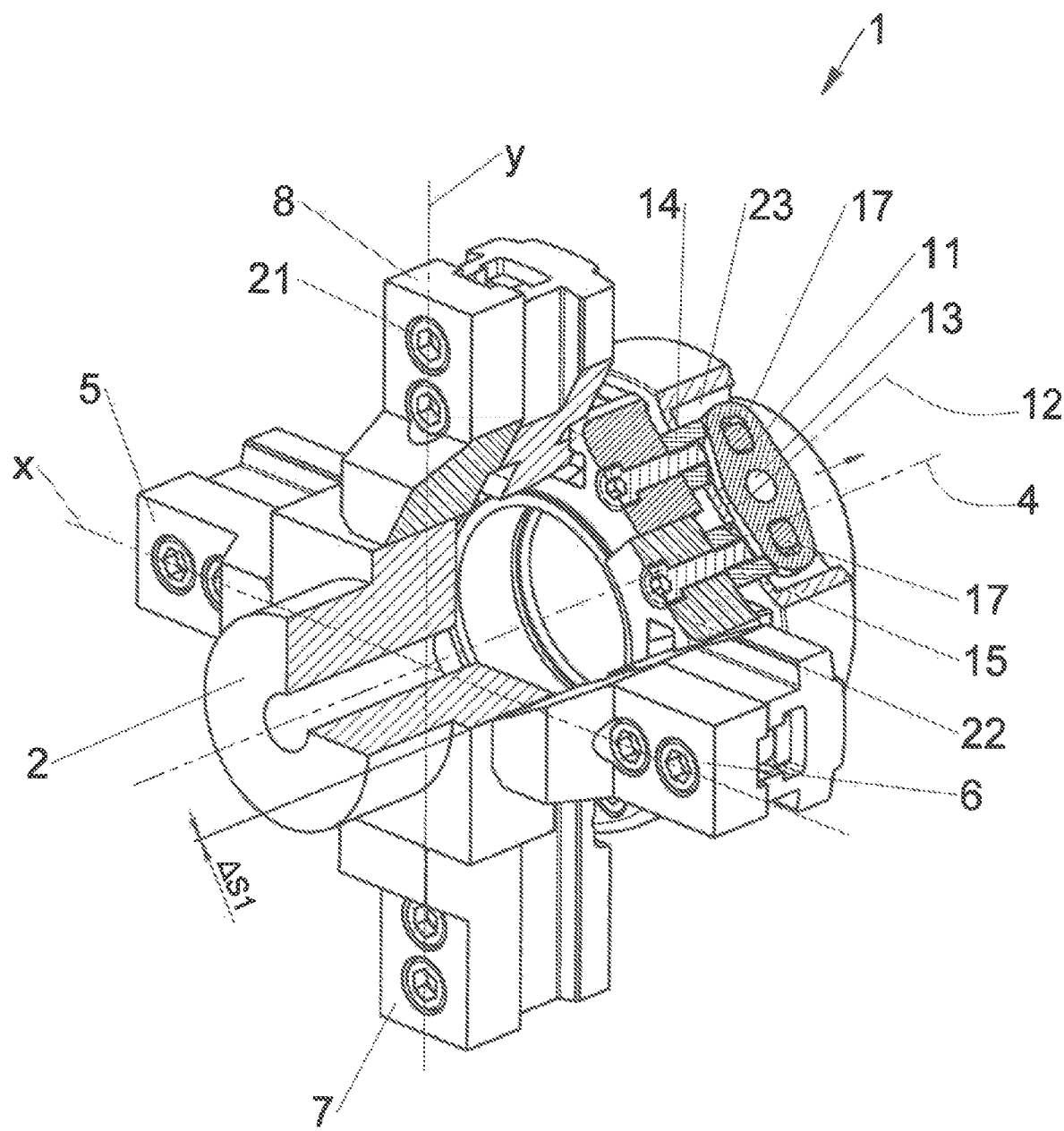
FIG. 5b shows the chuck shown in FIG. 1 is in a position where two diametrically opposed jaws are in contact with the workpiece and the vertical jaws are spaced from it.
Figure 5C:
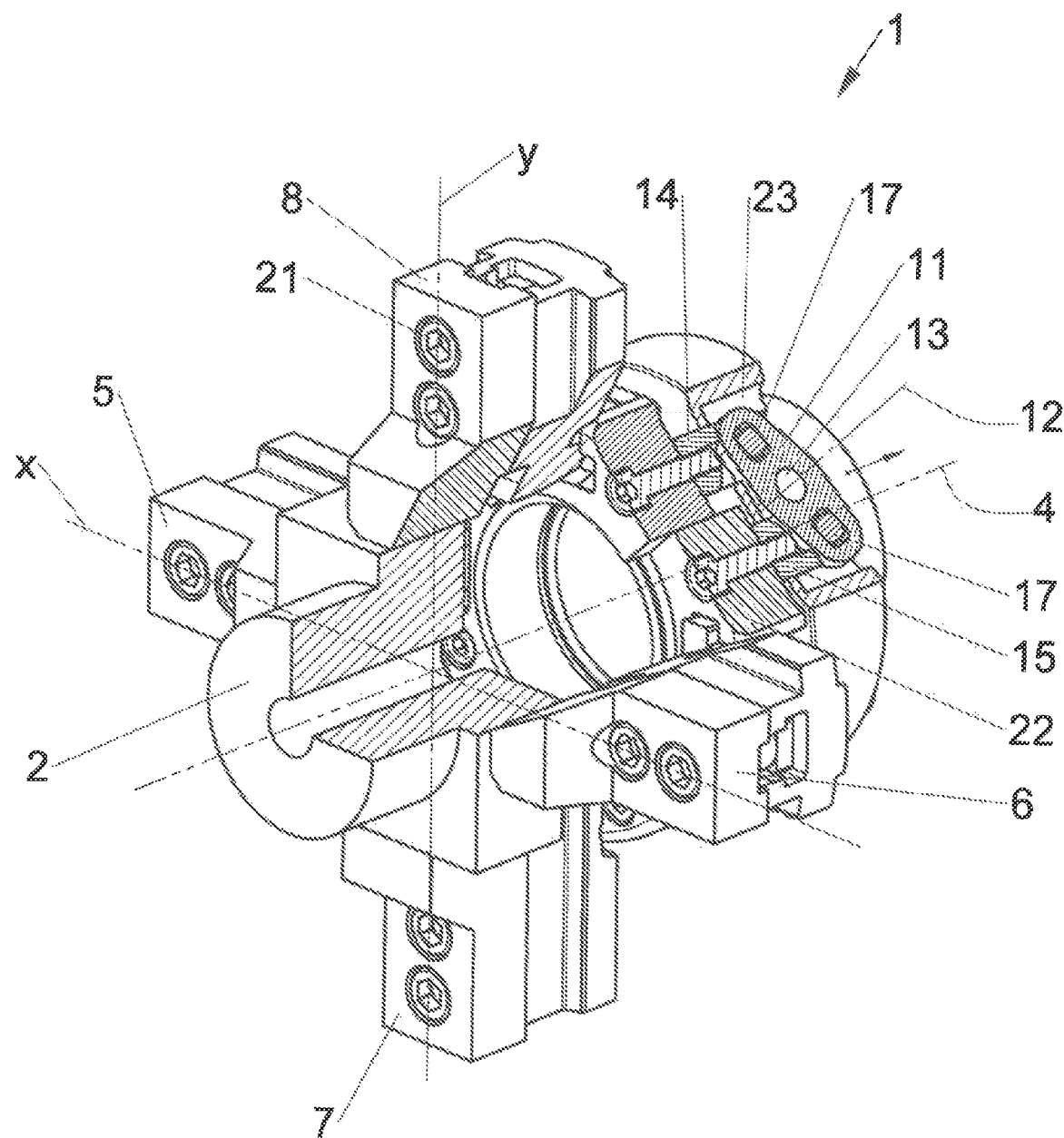
FIG. 5c shows the chuck as shown in FIG. 5a with a centered workpiece.

The transmission wedges 22 serve as a buffer or power transmission between the rocker 11 and the clamping jaws 5, 6, 7 or 8 and are mounted in the chuck body 3 so that they can be moved linearly FIGS. 5a, 5b and 5c show this motion sequence in detail in relation to the different operating and clamping states of the chuck 1. FIG. 5a shows that the chuck jaws 5, 6, 7 and 8 are differently spaced from the workpiece to be clamped. As soon as an actuating force is applied to the drive piston 9, the forces are transmitted to the rocker 11 via bolt 13 and to the respective clamping jaws 5, 6, 7 or 8 via the two transmission pins 14 and 15. The existing helical gearing 10 converts the linear resetting of the drive piston 9 into a radial feed movement of the clamping jaws 5, 6, 7 and 8, so that these move towards the workpiece 2 to be clamped FIG. 5b shows that the diametrically opposed clamping jaws 7 and 8 first make contact with the workpiece 2 and that this is thus aligned in the Y plane to the longitudinal axis 4. The rocker 11 is not yet actuated in this position of the clamping jaws 5 and 6, FIG. 5c shows how the difference between the clamping jaws 5 and 6 and the workpiece 2 is bridged or compensated by the deflection a of the rocker 11. The drive piston 9 was moved further in the operating direction and the clamping jaws 7 and 8 are held in their position as shown in FIG. 5b by swiveling the rocker 11, and only the clamping jaws 5 and 6, which are arranged vertically, are moved further until they hit the workpiece 2.

As soon as all four clamping jaws 5, 6 or 7 and 8 have reached their contact position at workpiece 2, the drive piston 9 generates the actual clamping force. The further it is driven, the higher the clamping force generated. The rocker 11 and the different arrangement of the transmission pins 14, 15 are not changed by this, so that these remain in the adopted balancing position.

By means of the chuck 1 in accordance with the present invention, workpieces 2 can thus be held centered in space and supported by the machine tool for their machining, which have any outer contour, because the inner contour of the clamping jaws 5, 6, 7, 8 are adapted to the outer contours of the differently designed workpieces 2 and can partially enclose them.

What is claimed is:

1. A chuck (1) by means of which workpieces (2) are supported individually and centered for machining by a machine tool, the chuck comprising:
   one chuck body (3),
   four clamping jaws (5, 6, 7, 8) which are radially movably mounted on the chuck body (3) and are each arranged in pairs in an X or Y plane, and
   a drive piston (9) which is mounted in the chuck body (3) so as to be axially movable and which is drivably coupled to the four clamping jaws (5, 6, 7, 8), and feeds the four clamping jaws synchronously in the direction of the workpiece (2) to be clamped or moves them away from the latter,
   characterized in that,
   a rocker (11) is provided between the drive piston (9) and in each case two adjacent clamping jaws (5, 7 or 6, 8),
   the rocker (11) has a center of symmetry (12) into which a bolt (13) which is pivotably mounted on the drive piston (9) and about which the rocker (11) can be pivoted as a function of the contact of the clamping jaws (5, 6 or 7, 8) on the workpiece (2) is inserted,
   a respective transmission pin (14, 15) is provided laterally adjacent to the bolt (13) and coupled drivably to the rocker (11), at the end of which pin opposite the rocker (11) the respective clamping jaw (5, 6, 7 or 8) is mounted and supported; and
   two guide grooves (16) are worked into the rocker (11), into each of which one of the transmission pins (14 or 15) is inserted so as to be slightly linearly movable, perpendicularly to the longitudinal axis (4) of the chuck body (3).

2. The chuck in accordance with claim 1, characterized in that, the pivoting of the rocker (11) produces a feed compensation for one of the two pairs of clamping jaws (5, 6, or 7, 8) which are moved in a common X or Y-plane.

3. The chuck in accordance with claim 1, characterized in that, a head (17), which engages in one of the guide grooves (16) of the rocker (11), is worked onto each transmission pin (14, 15), and in that the outer edges of the head (17), which run perpendicular to the feed movement of the rocker (11) and of the drive piston (9) respectively, are smaller in size than the length of the guide groove (16).

4. The chuck in accordance with claim 3, characterized in that, the head (17) bears against both opposite inner walls (18) of the guide groove (16) with respect to the feed direction of the rocker (11) and the head (17) can be acted upon by these with a feed force.

5. The chuck in accordance with claim 1, characterized in that, a centrifugal weight (19) is provided in the chuck body (3), which is mounted in the chuck body (3) so as to be displaceable therein perpendicularly to the feed direction of the drive piston (9), and in that the centrifugal weight (19) is drivably coupled via a lever (20) to one of the clamping jaws (5, 6, 7 or 8).

6. The chuck in accordance with claim 5, characterized in that, the lever (20) is inclined in the direction of the longitudinal axis (4) of the chuck body (3) during the clamping state of the clamping jaws (5, 6, 7, 8), and in that the centrifugal weight (19) is pressed radially outwards by the rotation of the chuck (1), in such a way that a radially acting clamping force is transmitted to the respective clamping jaws (5, 6, 7, 8) by the centrifugal weight (19) via the lever (20).

7. The chuck in accordance with claim 1, characterized in that, the distance between two transmission pins (14, 15) and the bolt (13) arranged in the center of symmetry (12) of the rocker (11) is the same.

8. The chuck in accordance with claim 1, characterized in that, the two transmission pins (14, 15) which are fastened to one rocker (11) run parallel and are mounted displaceably in the drive piston (9).

9. The chuck in accordance with claim 1, characterized in that, the outer contour of the workpiece (2) to be clamped has any desired configuration and in that the clamping jaws (5, 6, 7, 8) are adapted to the existing outer contours of the workpieces (2) and partially enclose them.

\* \* \* \* \*